(12) United States Patent
Cardinal et al.

(10) Patent No.: US 10,868,782 B2
(45) Date of Patent: Dec. 15, 2020

(54) SYSTEM FOR FLAGGING DATA TRANSMISSIONS FOR RETENTION OF METADATA AND TRIGGERING APPROPRIATE TRANSMISSION PLACEMENT

(71) Applicant: Bank of America Corporation, Charlotte, NC (US)

(72) Inventors: Donald Joseph Cardinal, Celina, TX (US); Christopher Daniel Birch, Dayton, OH (US); Shane Edward Asher, San Antonio, TX (US); Travis John Hicks, Cedar Park, TX (US); Todd Anthony Smialek, Fort Mill, SC (US); Shannon Sabina Willis, Pineville, NC (US); Guy Vernon Pearson, Jr., Columbia, MD (US); Corey Scott Gillespie, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 147 days.

(21) Appl. No.: 16/034,079

(22) Filed: Jul. 12, 2018

(65) Prior Publication Data

US 2020/0021546 A1  Jan. 16, 2020

(51) Int. Cl.
*H04L 12/58* (2006.01)
*G06F 3/01* (2006.01)
*H04L 29/06* (2006.01)

(52) U.S. Cl.
CPC .............. *H04L 51/12* (2013.01); *G06F 3/017* (2013.01); *H04L 51/14* (2013.01); *H04L 51/22* (2013.01);
(Continued)

(58) Field of Classification Search
CPC ..... H04L 51/12; H04L 63/14; H04L 63/0227; H04L 63/0245; H04L 63/1433;
(Continued)

(56) References Cited

U.S. PATENT DOCUMENTS

| 787,021 A | 4/1905 | Biber |
| 7,003,551 B2 * | 2/2006 | Malik ..................... H04L 51/08 709/206 |

(Continued)

FOREIGN PATENT DOCUMENTS

| WO | 2006119790 A1 | 11/2006 |
| WO | 2007062429 A2 | 5/2007 |

(Continued)

OTHER PUBLICATIONS

ServerFault, "When an email is forwarded, does it lose its original headers?", Jul. 22, 2010 https://serverfault.com/questions/163160/when-an-ennail-is-forwarded-does-it-lose-its-original-headers (Year: 2010).*

(Continued)

*Primary Examiner* — Ramy M Osman
(74) *Attorney, Agent, or Firm* — Michael A. Springs; Moore & Van Allen PLLC; James C. Edwards

(57) ABSTRACT

Embodiments provide a system for flagging data transmissions for retention of metadata and triggering appropriate transmission placement. Embodiments receive a plurality of data transmissions represented in a transmission queue; determine that a first data transmission of the plurality of data transmissions is suspicious; and, in response to the determination, automatically flag the first data transmission for retention of metadata associated with the first data transmission. The data transmission may then be placed in an appropriate location.

10 Claims, 3 Drawing Sheets

(52) U.S. Cl.
CPC .......... *H04L 63/0227* (2013.01); *H04L 63/14* (2013.01); *H04L 63/1408* (2013.01); *H04L 63/1433* (2013.01); *H04L 51/36* (2013.01)

(58) Field of Classification Search
CPC ..... H04L 63/1408; H04L 51/22; H04L 51/14; H04L 51/36; H04L 63/1425; G06F 21/552
See application file for complete search history.

(56) References Cited

U.S. PATENT DOCUMENTS

| | | | |
|---|---|---|---|
| 7,373,607 B2 | 5/2008 | Daniell | |
| 7,624,347 B2 | 11/2009 | Daniell | |
| 7,877,807 B2 | 1/2011 | Shipp | |
| 7,941,415 B2 | 5/2011 | Gile et al. | |
| 7,958,557 B2 | 6/2011 | Kwan | |
| 8,024,411 B2 | 9/2011 | Pulfer et al. | |
| 8,161,527 B2 | 4/2012 | Curren | |
| 8,375,008 B1 | 2/2013 | Gomes | |
| 8,616,896 B2 | 12/2013 | Lennox | |
| 8,695,058 B2 | 4/2014 | Batchu et al. | |
| 8,738,721 B1* | 5/2014 | Smirnov | H04L 51/12 709/206 |
| 8,745,091 B2 | 6/2014 | McHenry et al. | |
| 8,832,406 B2 | 9/2014 | Prahlad et al. | |
| 8,935,492 B2 | 1/2015 | Gokhale et al. | |
| 8,972,495 B1* | 3/2015 | Borna | H04L 51/08 709/204 |
| 9,262,275 B2 | 2/2016 | Gokhale et al. | |
| 9,378,265 B2 | 6/2016 | McHenry et al. | |
| 9,461,890 B1 | 10/2016 | Nair et al. | |
| 9,548,988 B1* | 1/2017 | Roundy | H04L 63/1416 |
| 9,559,997 B1 | 1/2017 | Everton | |
| 9,639,563 B2 | 5/2017 | Gokhale et al. | |
| 9,774,626 B1 | 9/2017 | Himler et al. | |
| 9,781,149 B1 | 10/2017 | Himler et al. | |
| 9,819,630 B2 | 11/2017 | Johnstone et al. | |
| 9,928,244 B2 | 3/2018 | McHenry et al. | |
| 9,946,789 B1* | 4/2018 | Li | H04L 51/12 |
| 10,243,904 B1* | 3/2019 | Wescoe | H04L 63/1433 |
| 2003/0196094 A1 | 10/2003 | Hillis et al. | |
| 2003/0229672 A1* | 12/2003 | Kohn | H04L 51/12 709/207 |
| 2004/0051736 A1* | 3/2004 | Daniell | H04L 51/14 715/752 |
| 2005/0065906 A1* | 3/2005 | Romero | G06Q 10/107 |
| 2006/0200530 A1* | 9/2006 | Tokuda | H04L 51/24 709/206 |
| 2006/0259468 A1 | 11/2006 | Brooks et al. | |
| 2007/0005716 A1* | 1/2007 | LeVasseur | H04L 51/12 709/206 |
| 2007/0168436 A1* | 7/2007 | Andam | G06Q 10/107 709/206 |
| 2007/0185926 A1 | 8/2007 | Prahlad et al. | |
| 2008/0091785 A1 | 4/2008 | Pulfer et al. | |
| 2008/0098078 A1* | 4/2008 | Daniell | G06Q 10/107 709/206 |
| 2008/0168149 A1* | 7/2008 | Daniell | H04L 51/12 709/206 |
| 2009/0313342 A1* | 12/2009 | Thie | H04L 51/22 709/206 |
| 2010/0189251 A1 | 7/2010 | Curren | |
| 2010/0251362 A1* | 9/2010 | Gillum | H04L 51/12 726/22 |
| 2010/0332428 A1 | 12/2010 | McHenry et al. | |
| 2011/0205576 A1 | 8/2011 | Halron et al. | |
| 2011/0238979 A1* | 9/2011 | Harp | H04L 63/1441 713/153 |
| 2011/0294106 A1 | 12/2011 | Lennox | |
| 2011/0307955 A1* | 12/2011 | Kaplan | H04L 63/0227 726/23 |
| 2012/0084524 A1 | 4/2012 | Gokhale et al. | |
| 2013/0325991 A1 | 12/2013 | Chambers et al. | |
| 2014/0101160 A1 | 4/2014 | Prahlad et al. | |
| 2014/0149414 A1 | 5/2014 | Lennox | |
| 2014/0164437 A1 | 6/2014 | Batchu et al. | |
| 2014/0279937 A1 | 9/2014 | McHenry et al. | |
| 2015/0100896 A1* | 4/2015 | Shmarovoz | H04L 51/12 715/752 |
| 2015/0134924 A1 | 5/2015 | Gokhale et al. | |
| 2015/0281153 A1* | 10/2015 | Murtagh | H04L 51/10 709/206 |
| 2016/0191548 A1* | 6/2016 | Smith | H04L 63/1416 726/23 |
| 2016/0224598 A1 | 8/2016 | Gokhale et al. | |
| 2016/0308812 A1 | 10/2016 | Johnstone et al. | |
| 2017/0093771 A1* | 3/2017 | Gatti | H04L 51/28 |
| 2017/0214701 A1 | 7/2017 | Hasan | |
| 2017/0351727 A1 | 12/2017 | Zbogar-Smith et al. | |
| 2018/0013710 A1 | 1/2018 | Khan | |
| 2018/0159889 A1* | 6/2018 | Sjouwerman | H04L 63/1433 |
| 2019/0132273 A1* | 5/2019 | Ryan | H04L 63/1433 |
| 2020/0021546 A1* | 1/2020 | Cardinal | H04L 51/14 |
| 2020/0092325 A1* | 3/2020 | Kolingivadi | H04L 41/22 |

FOREIGN PATENT DOCUMENTS

| | | |
|---|---|---|
| WO | 2008036621 A2 | 3/2008 |
| WO | 2010001406 A1 | 1/2010 |
| WO | 2011002777 A2 | 1/2011 |
| WO | 2011146553 A1 | 11/2011 |
| WO | 2012045023 A2 | 4/2012 |
| WO | 2012139127 A1 | 10/2012 |
| WO | 2017127850 A1 | 7/2017 |

OTHER PUBLICATIONS

Clews et al, "How can I view the "full headers" of an email?", Mar. 12, 2004, University of Sussex http://www.sussex.ac.uk/its/help/faq?faqid=1080 (Year: 2004).*

* cited by examiner

SYSTEM FOR FLAGGING DATA TRANSMISSIONS FOR RETENTION OF METADATA AND TRIGGERING APPROPRIATE TRANSMISSION PLACEMENT

FIELD OF THE INVENTION

The present invention embraces a system for flagging data transmissions for retention of metadata and triggering appropriate transmission placement.

BACKGROUND

With recent developments in e-mail technology, users may establish junk folders or quarantine programs may filter suspicious messages. However, when messages are moved from their original locations, oftentimes useful metadata is lost. Accordingly, there is a need for a data transmission system that retains metadata of suspicious messages.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide a system for flagging data transmissions for metadata retention. The system comprises a memory device; and one or more processing devices operatively coupled to the memory device, wherein the one or more processing devices are configured to execute computer-readable program code stored on the memory device for receiving a plurality of data transmissions represented in a transmission queue; determining that a first data transmission of the plurality of data transmissions is suspicious; and in response to the determination, automatically flagging the first data transmission for retention of metadata associated with the first data transmission.

In some embodiments, the computer-readable program code stored on the memory device is further for placing the flagged first data transmission in a queue for suspicious transmissions.

In some embodiments, the computer-readable program code stored on the memory device is further for determining that the flagged first data transmission should be placed in a queue for suspicious transmissions; and in response, automatically placing the flagged first data transmission in the queue for suspicious transmissions.

In some such embodiments, the computer-readable program code stored on the memory device is further for in response to both (i) flagging the first data transmission for retention of metadata associated with the first data transmission and (ii) determining that the flagged first data transmission should be placed in a queue for suspicious transmissions, automatically storing the metadata associated with the first data transmission prior to placing the flagged first data transmission in the queue for suspicious transmissions.

In other embodiments, the computer-readable program code stored on the memory device is further for in response to flagging the first data transmission for retention of metadata associated with the first data transmission, automatically store the metadata associated with the first data transmission.

In some embodiments, determining that a first data transmission is suspicious comprises receiving a gesture from a user via a user interface.

In some embodiments, determining that the flagged first data transmission should be placed in a queue for suspicious transmissions comprises receiving a gesture from a user via a user interface.

In some embodiments, determining that the first data transmission of the plurality of data transmissions is suspicious comprises accessing a private distributed ledger comprising contact information for a plurality of legitimate contacts and determining whether a sender of the first data transmission is one of the plurality of legitimate contacts.

According to embodiments of the invention, a computer program product for flagging data transmissions for retention of metadata includes at least one non-transitory computer readable medium comprising computer readable instructions, the instructions comprising instructions for receiving a plurality of data transmissions represented in a transmission queue; determining that a first data transmission of the plurality of data transmissions is suspicious; and in response to the determination, automatically flagging the first data transmission for retention of metadata associated with the first data transmission.

In some embodiments, the instructions further comprise instructions for placing the flagged first data transmission in a queue for suspicious transmissions.

In some such embodiments, the instructions further comprise instructions for determining that the flagged first data transmission should be placed in a queue for suspicious transmissions; and in response, automatically placing the flagged first data transmission in the queue for suspicious transmissions.

In some embodiments, the instructions further comprise instructions for in response to both (i) flagging the first data transmission for retention of metadata associated with the first data transmission and (ii) determining that the flagged first data transmission should be placed in a queue for suspicious transmissions, automatically storing the metadata associated with the first data transmission prior to placing the flagged first data transmission in the queue for suspicious transmissions.

In some embodiments, the instructions further comprise instructions for in response to flagging the first data transmission for retention of metadata associated with the first data transmission, automatically store the metadata associated with the first data transmission.

In some embodiments, determining that a first data transmission is suspicious comprises receiving a gesture from a user via a user interface.

In some embodiments, determining that the flagged first data transmission should be placed in a queue for suspicious transmissions comprises receiving a gesture from a user via a user interface.

In some embodiments, determining that the first data transmission of the plurality of data transmissions is suspicious comprises accessing a private distributed ledger comprising contact information for a plurality of legitimate contacts and determining whether a sender of the first data transmission is one of the plurality of legitimate contacts.

According to embodiments of the invention, a computer implemented method for flagging data transmissions for retention of metadata is performed by a computing system comprising a computer processing device and a non-transitory computer readable medium, where the computer readable medium comprises configured computer program instruction code, such that when said instruction code is operated by said computer processing device the computing system performs the method steps comprising receiving a plurality of data transmissions represented in a transmission queue; determining that a first data transmission of the plurality of data transmissions is suspicious; and in response to the determination, automatically flagging the first data transmission for retention of metadata associated with the first data transmission.

In some embodiments, the computing system further performs the method steps comprising placing the flagged first data transmission in a queue for suspicious transmissions.

In some such embodiments, the computing system further performs the method steps comprising determining that the flagged first data transmission should be placed in a queue for suspicious transmissions; and in response, automatically placing the flagged first data transmission in the queue for suspicious transmissions.

In other embodiments, the computing system further performs the method steps comprising in response to both (i) flagging the first data transmission for retention of metadata associated with the first data transmission and (ii) determining that the flagged first data transmission should be placed in a queue for suspicious transmissions, automatically storing the metadata associated with the first data transmission prior to placing the flagged first data transmission in the queue for suspicious transmissions.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
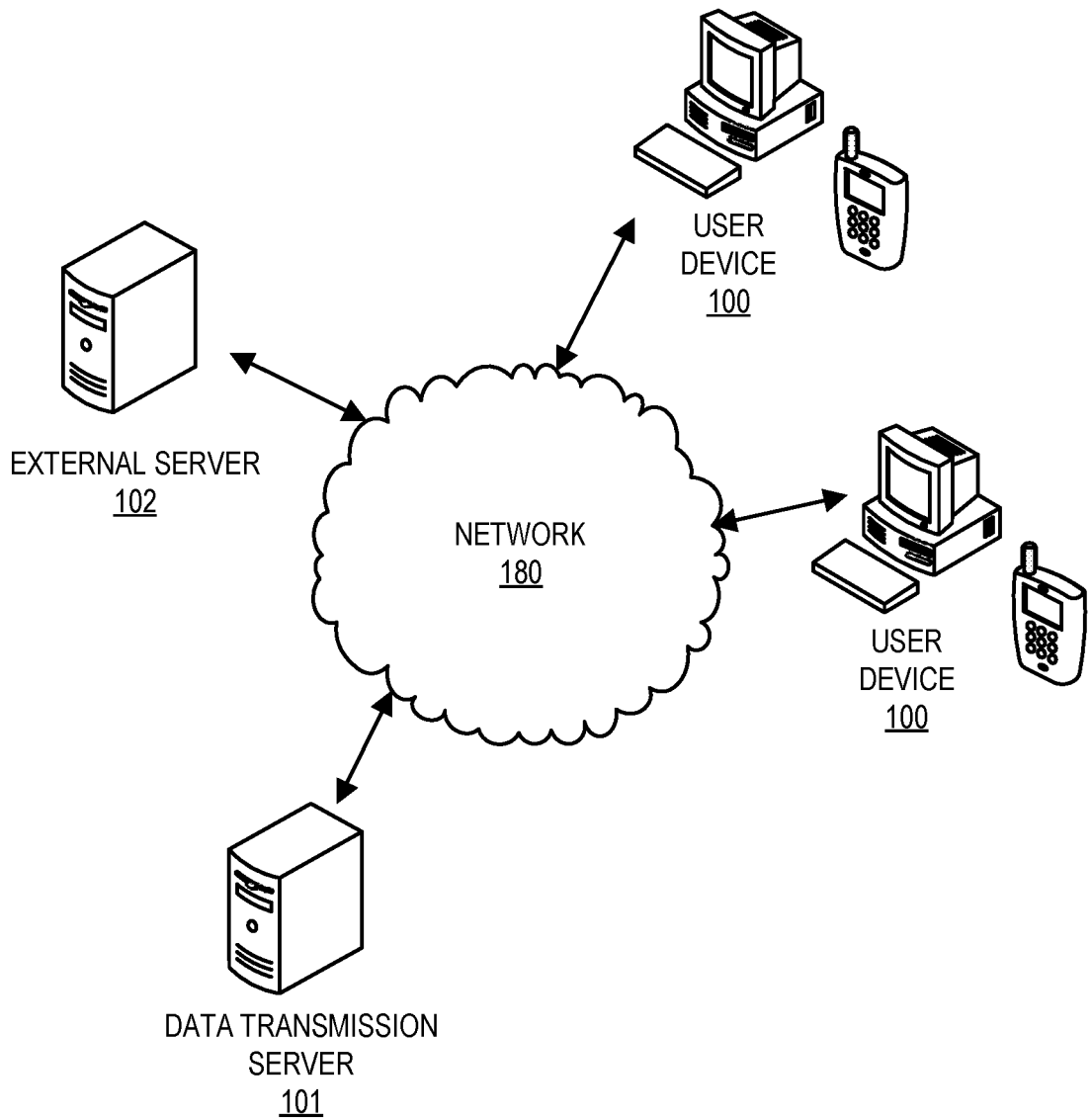
Figure 2:
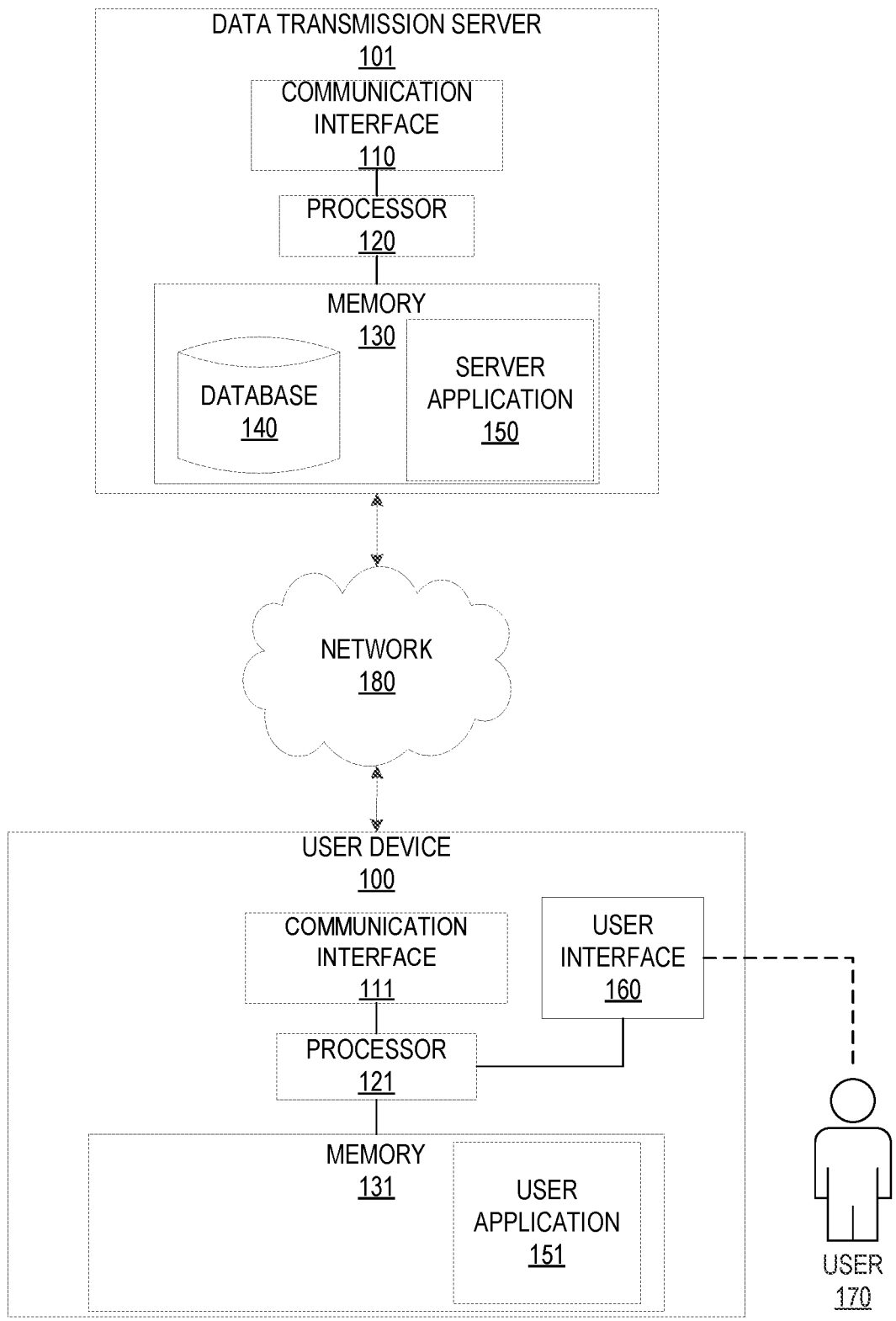
Figure 3:
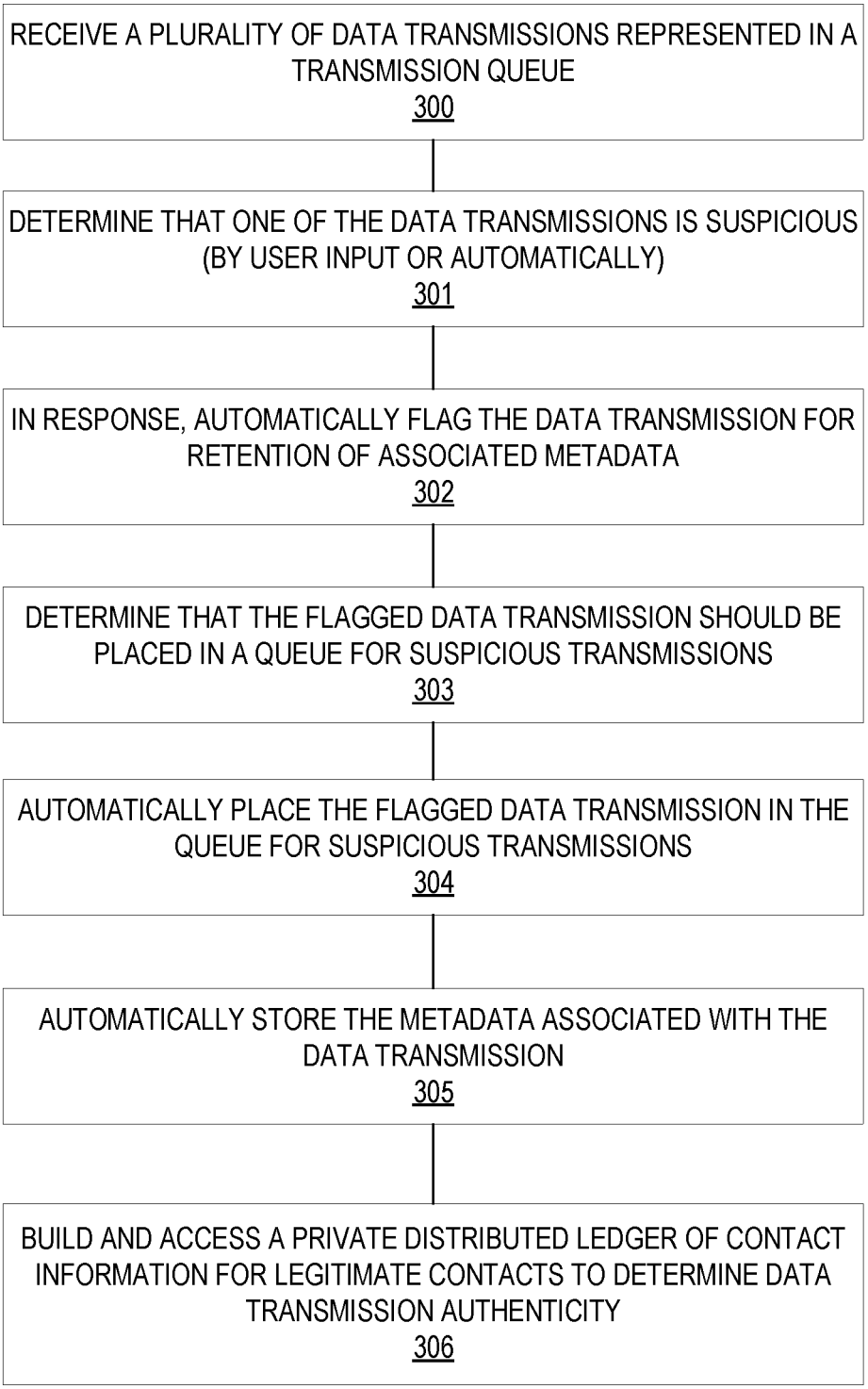

Having thus described embodiments of the invention in general terms, reference will now be made to the accompanying drawings, wherein:

FIG. 1 depicts an operating environment, in accordance with one embodiment of the present invention;

FIG. 2 depicts a schematic of a user device and a data transmission server, in accordance with one embodiment of the present invention; and FIG. 3 illustrates a process flow for metadata retention, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Embodiments of the invention provide for a system that receives data transmissions from disparate nodes and holds them or represents them in a transmission queue. Some of the transmissions may be suspicious (i.e., from nefarious senders). Embodiments provide a universal email-client plugin and/or service that enables a user to report a suspicious email with a simple gesture and retain header (or metadata) information. Currently, customers and employees of enterprises may report suspicious email activity by forwarding emails to technical support and systems engineers. However, simply forwarding emails typically strips certain metadata from the original communications, such as the originating IP address, email address and the like. Embodiments of the invention also include an email suite web form that provides drag and drop capability that enables a user to select an email, drag the email to a certain location, and automatically forward the email to the correct party (e.g., technical support) while retaining valuable metadata. Additionally, the system may include a private distributed ledger maintained and strictly accessed and edited by the enterprise. The private distributed ledger may include entries for keeping track of legitimate, valid contacts and their information. The data transmission system can access the distributed ledger to determine whether a transmission sender is a legitimate sender to verify authenticity.

"User" as used herein may refer to an individual or entity that is authorized and authenticated to utilize a system for metadata retention as described herein.

"Entity" as used herein may refer to an individual or an organization that owns and/or operates the data transmission servers and/or systems and the associated computing systems. The entity may be a business organization, a non-profit organization, a government organization, and the like.

"User device" as used herein may refer to a computing device used by the user to access the system through an online portal. The user device may include a processor, a non-transitory storage medium, a communications device, and a display. The system may support user logins and inputs from any combination of similar or disparate devices. Accordingly, the user device may be a portable electronic device such as a smartphone, tablet, or laptop, or the user device may be a stationary unit such as a personal desktop computer or a networked terminal within an entity's premises.

In some embodiments, the system may be owned or operated by an entity. In such embodiments, the entity may employ additional computer systems, such as authentication servers, to validate and certify resources inputted by the plurality of users within the system. The system may further establish different levels of authentication and/or authorization for multiple users associated with entity, such that a primary user may be authorized to utilize more functions than secondary users.

As used herein, a "memory device" generally refers to a device or combination of devices that store one or more forms of computer-readable media and/or computer-executable program code/instructions. For example, in one embodiment, a memory device includes any computer memory that provides an actual or virtual space to temporarily or permanently store data and/or commands provided to a processing device when it carries out its functions described herein.

In some embodiments, data transmissions, metadata, or other data may be stored in a non-volatile memory distinct from instructions for executing one or more process steps discussed herein that may be stored in a volatile memory such as a memory directly connected or directly in communication with a processing device executing the instructions. In this regard, some or all the process steps carried out by the processing device may be executed in near-real-time, thereby increasing the efficiency by which the processing device may execute the instructions as compared to a situation where one or more of the instructions are stored and executed from a non-volatile memory, which may require greater access time than a directly connected volatile memory source. In some embodiments, one or more of the instructions are stored in a non-volatile memory and are accessed and temporarily stored (i.e., buffered) in a volatile memory directly connected with the processing device where they are executed by the processing device. Thus, in various embodiments discussed herein, the memory or memory device of a system or device may refer to one or more non-volatile memory devices and/or one or more volatile memory devices.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

FIG. 1 is a block diagram illustrating an operating environment 001, in accordance with one embodiment of the present invention. The operating environment may include a plurality of user devices 100 in operative communication with a data transmission server 101 over a network 180. The network 180 may also be a global area network (GAN), such as the Internet, a wide area network (WAN), a local area network (LAN), or any other type of network or combination of networks. The network 180 may provide for wireline, wireless, or a combination wireline and wireless communication between devices on the network 180. The user device may be a user device such as a smartphone, tablet, or laptop, a personal computing device such as a desktop computer, smart device, single board computer, or a device owned and operated by an entity, such as a computer system terminal located on the entity's premises. The data transmission server 101 is responsible for running the data transmission application and running its various processes. It should be understood that the data transmission server 101 as depicted herein may be embodied in a single server or multiple servers distributed over varying geographic distances.

Generally, the user devices 100 are used to log onto the data transmission server 101 over the network 180 to access the online portal (e.g., over a secure communication channel). The data transmission server 101 may require that authentication credentials are provided by the user device 100. In some embodiments, the authentication credentials may include a username, password, a biometric identifier, a cryptographic key, a token, and the like. The data transmission server 101 may further require that more than one authentication credential is provided as parts of a multi-step authentication process. Once the user has been authenticated, the user may log onto the online portal on the data transmission server 101 using the user device 100 to access the data transmission (e.g., email) management tools therein.

In some embodiments, the operating environment may further include an external server 102 which may be in operative communication with the user device 100, the data transmission server 101, or both, over the network 180. The external server 102 may contain data associated with the user which may be accessed by some of the data transmission tools running on the data transmission server 101.

FIG. 2 is a block diagram illustrating the data transmission server 101 and the user device 100 in more detail, in accordance with one embodiment of the present invention. The data transmission server 101 typically contains a processor 120 communicably coupled to such devices as a communication interface 110 and a memory 130. The processor 120, and other processors described herein, typically includes circuitry for implementing communication and/or logic functions of the server 101. For example, the processor 120 may include a digital signal processor device, a microprocessor device, and various analog to digital converters, digital to analog converters, and/or other support circuits.

The data transmission server may use the communication interface 110 to communicate with other devices over the network 180. The communication interface 110 as used herein may include an Ethernet interface, an antenna coupled to a transceiver configured to operate on a cellular data or WiFi signal, and/or a near field communication ("NFC") interface.

The data transmission server may include a memory 130 operatively coupled to the processor 120. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

Typically, a data transmission server application 150 is stored within the memory 130 to implement the functions of the online portal through the processor 120 on the data transmission server 101. The data transmission server application 150 allows a user 170 to connect to the data transmission server 101 through a user device 100, in order to access the data transmission information therein as well as utilize the data transmission tools provided through the online portal. The data transmission server application 150 includes the logic code portions to determine the appropriate recommended user actions as well as the code portions to collect usage and historical data from the plurality of users 170 within the system.

The memory 130 may further include a database 140 containing data to be processed and/or manipulated by the data transmission server application 150. The database 140 may contain usage and historical data provide by the users 170. The database 140 may also contain data on the various classifications to be used to categorize the data transmissions (e.g., inbox, sent, suspicious, etc.) and the users, on what classifications correspond to which data transmissions, as well as logical links between and amongst the various data transmissions, senders, and the users. The database may include a private distributed ledger as discussed herein. It should be understood that while the database 140 is depicted as a single unit within a single data transmission server in FIG. 3, the database 140 may represent multiple databases implemented across multiple data transmission servers 101. It should also be understood that the data transmission server application 150 may implemented in a distributed manner amongst a plurality data transmission servers 101. The database 140 may also be stored on a separate, distinct memory 130 from the data transmission server application 150.

The user device 100 typically also includes a processor 121 operatively coupled to a communication interface 111 and a memory 131. The memory 131 typically stores a user application 151, which causes the processor 121 to display a user interface 160 to the user 170. It should be understood that the display on which the user interface 160 is presented may include an integrated display (e.g. a tablet or smartphone screen) within the user device 100, or an external display device (e.g. a computer monitor or television). The user application 151 establishes a connection with the data transmission server application 150 over the network 180 to allow the user 170 to access the various functions of the system. In particular, the user application 151 receives inputs from the user interface 160, which may include such inputs as user authentication credentials, requests to view resource data, requests to utilize the resource management tools of the data transmission server application 150, and the like.

In a typical embodiment of the invention, the user 170 accesses the user application 151 through the user interface 160. The user application 151 sends a request over the network 180 to establish a communication link with the data transmission server 101 through the data transmission server application 150. Upon receiving the request, the data transmission server application 150 causes the data transmission server 101 to send a command to the user device 100 to prompt the user 170 for authentication credentials through the user interface 160. Upon receiving authentication credentials from the user 170, the user application 151 sends the authentication credentials to the data transmission server application 150. Upon successful authentication, a communication link between the user application 151 and the data transmission server application 150 is established. The user 170 then provides a request to access data transmissions (and/or the private distributed ledger of legitimate contacts) via the user application 151, which then sends the request to the data transmission server application 150. The data transmission server application 150 then provides data transmission tools to the user through the graphical user interface 160, through which the user 170 may take a number of actions with regard to the data transmissions.

The system may store user activity data within the online portal within the database 140. In some embodiments, the data transmission server application 150 may cause the processor 120 to periodically query the user device 100 to obtain snapshots of the state of the user application 151. Upon receiving the query, the user application 151 immediately obtain a snapshot of user actions taken within the graphical interface, then send the snapshot to the data transmission server 101. In other embodiments, the user application 151 may continuously track user inputs and temporarily store them in the memory 131, then send the history of user inputs to the data transmission server 101 upon receiving the query. In other embodiments, the user application 151 may periodically track the user's inputs and push the input data to the data transmission server 101 without waiting to receive a query.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

In some embodiments, a dedicated communication channel between a user device and the data transmission server and/or between the data transmission server and a storage location for transmission metadata and/or other transmission data is/are established. In some cases, more than one network, system or communication pathway makes up the dedicated communication channel discussed herein. In some cases, only those pathways makeup the dedicated communication channel(s). In some embodiments, the institution system serves as a control system and sends control signals that cause the user device(s) to establish a dedicated communication channel between the user device and the institution systems. In some cases, the dedicated communication channel is optimized so that the information may be communicated more efficiently than is could be over a non-dedicated communication channel. For example, a non-dedicated communication channel may utilize insecure network connections or systems or may utilize unstable or noise-prone network connections or systems. Thus, when establishing a dedicated communication channel, the control system may optimize parameters of the dedicated communication channel such that the communication channel is less prone to interruption from security breach, other traffic, offline systems or the like. This may be done by, for example, designating certain systems on the network between the control system and the user device, respectively, as low-functioning, medium-functioning, or high-functioning network systems/hubs/connections/channels (collectively referred to as network systems). In various other embodiments, the number of categories of systems may be raised or lowered. For example, there may be five (5) distinct categories of systems. The various network systems may be categorized by one or more administrators and/or automatically based on one or more monitoring modules or applications running on the various systems. Such a monitoring system may flag any abnormalities in network communication such as an unintended offline network system, a security breach of a network system, a network communication affected negatively by noise or interference (in some cases based on a predetermined threshold of interference or communication errors). Thus, once various network systems are categorized, the control system and/or the user device may optimize the dedicated communication channel by selecting appropriately categorized network systems for the communication channel. For example, the user device may establish a dedicated communication channel in order to send and receive authentication credentials and validation or newly issued tokens. When establishing the dedicated communication channel, the user device or control system may only select high-functioning network systems in order to ensure that the high priority information may be reliably communicated from the user device to the control system and vice versa. In another example, certain user devices (and/or their installed user applications) are designated or categorized and always provided a dedicated (or non-dedicated) communication channel based on their respective categorization.

Referring now to FIG. 3, a process flow 003 for retaining metadata, in accordance with one embodiment of the present invention is shown. The process begins at block 300, where the system receives a plurality of data transmissions stored and/or represented in a data transmission queue (such as an email inbox).

Next, as represented by block 301, the system determines that one of the data transmissions is suspicious. This may be done by user input through the user interface or may be done automatically by the system. Automatic determination of suspicious data transmissions may be done by key word searching of each transmission to identify words or combinations of words that may indicate a message is suspicious. Messages may be given a score and compared to a threshold to determine whether they are suspicious. Alternatively, or in addition, the system may analyze a number of characteristics of a particular data transmission and compare the results to historical information indicating characteristics shared or likely shared by legitimate versus illegitimate transmissions.

Next, as represented by block 302, in response the system automatically flags the data transmission for retention of associated metadata. Then, as represented by block 303, the system determines that the flagged data transmission should be placed in a queue for suspicious transmissions. This determination may be done by receiving a user input to that effect or may be done automatically. The user input may be in the form of a gesture. A gesture may be or include any user action that may be captured by an input device of a computer such as a mouse movement or click or hand motion or action.

Next, as represented by block 304, the system automatically places the flagged data transmission in the queue for suspicious transmissions. This may be done by forwarding the data transmission to another recipient, such as a security branch of the enterprise, or may be done by placing the transmission into a bin or folder in the user interface, such as by a drag-and-drop functionality.

The queue for suspicious transmissions and/or a queue for storing metadata associated with the potentially illegitimate transmissions may be stored in a separate memory location that is walled-off from standard memory locations by firewall or physical separation. Such configuration may be implemented in order to minimize or prevent security risk.

The next step, as represented by block 305, is for the system to automatically store the metadata associated with the data transmission. The metadata may be stored in the server, in the user device or in another location as discussed above.

In some embodiments, as represented by block 306, the system builds and/or accesses a private distributed ledger. The private distributed ledger may include entries of contact information for legitimate contacts used to determine data transmission authenticity. For example, the private distributed ledger may only be accessible by users and associates of the enterprise and may provide a "white list" or list of acceptable senders of data transmissions. The senders of the data transmissions under review may be manually or automatically compared to the entries in the distributed ledger to ascertain whether the senders are legitimate senders.

If not, the data transmissions may be flagged as illegitimate and stored in a safe location. If their metadata has not, at that point, been stored, it may be stored in a safe location for future reference. If so, the data transmissions may be flagged as legitimate and also may be flagged as considered for suspiciousness and cleared as legitimate. In some embodiments, the system is a dynamic system that leverages an artificial intelligence engine that learns characteristics of historical data transmissions to automatically flag new data transmissions as likely illegitimate or likely legitimate. Then, in some cases, the other steps discussed herein may be performed.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for flagging data transmissions for retention of metadata within a personal data transmission and receipt web-based service, the system comprising:
   a memory device; and
   one or more processing devices operatively coupled to the memory device, wherein the one or more processing devices are configured to execute computer-readable program code within the personal data transmission and receipt web-based service stored on the memory device for:
      receiving a plurality of data transmissions represented in a transmission queue, wherein the data transmissions are electronic mail (email) and the transmission queue is an email inbox associated with a user;
      determining that a first data transmission of the plurality of data transmissions is suspicious, wherein determining comprises receiving a predetermined singular input from the user that indicates that the first transmission is suspicious;
      in response to the determination, automatically:
         flagging the first data transmission for retention of metadata associated with the first data transmission, wherein the metadata comprises data included in a header of the first data transmission;
         placing the flagged first data transmission in a first queue for suspicious transmissions, wherein placing the first data transmission in the first queue for suspicious transmissions includes at least one of (i) forwarding the data transmission to another predetermined recipient, and (ii) moving the transmission into a designated folder visible in a user interface of the personal data transmission and receipt web-based service; and
         in response to both (i) flagging the first data transmission for retention of the metadata associated with the first data transmission, and (ii) determining that the first data transmission is suspicious, automatically storing the metadata associated with the first data transmission, in a second queue for data transmission metadata retention, prior to placing the flagged first data transmission in the first queue for suspicious transmissions.

2. The system of claim 1, wherein the computer-readable program code stored on the memory device is further for:
   in response to flagging the first data transmission for retention of metadata associated with the first data transmission, automatically store the metadata associated with the first data transmission.

3. The system of claim 1, wherein determining that a first data transmission is suspicious further comprises receiving the predetermined singular input in a form of a gesture via a user interface.

4. The system of claim 3, wherein determining that the flagged first data transmission should be placed in the first queue for suspicious transmissions comprises receiving a gesture from a user via a user interface.

5. The system of claim 1, wherein determining that the first data transmission of the plurality of data transmissions is suspicious further comprises accessing a private distributed ledger comprising contact information for a plurality of legitimate contacts and determining whether a sender of the first data transmission is one of the plurality of legitimate contacts.

6. A computer program product for flagging data transmissions for retention of metadata within a personal data transmission and receipt web-based service, the computer program product comprising at least one non-transitory computer readable medium comprising computer readable instructions, the instructions implemented within a personal data transmission and receipt web-based service and comprising instructions for:
   receiving a plurality of data transmissions represented in a transmission queue, wherein the data transmissions are electronic mail (email) and the transmission queue is an email inbox associated with a user;
   determining that a first data transmission of the plurality of data transmissions is suspicious, wherein determining comprises receiving a predetermined singular input from the user that indicates that the first transmission is suspicious; and
   in response to the determination, automatically:
      flagging the first data transmission for retention of metadata associated with the first data transmission, wherein the metadata comprises data included in a header of the first data transmission;
      placing the flagged first data transmission in a first queue for suspicious transmissions, wherein placing the first data transmission in the first queue for suspicious transmissions includes at least one of (i) forwarding the data transmission to another predetermined recipient, and (ii) moving the transmission into a designated folder visible in a user interface of the personal data transmission and receipt web-based service; and in response to both (i) flagging the first data transmission for retention of the metadata associated with the first data transmission, and (ii) determining that the first data transmission is suspicious, automatically storing the metadata associated with the first data transmission, in a second queue for data transmission metadata retention, prior to placing the flagged first data transmission in the first queue for suspicious transmissions.

7. The computer program product of claim 6, wherein determining that a first data transmission is suspicious further comprises receiving the predetermined singular input in a form of a gesture via a user interface.

8. The computer program product of claim 6, wherein determining that the flagged first data transmission should be placed in the first queue for suspicious transmissions comprises receiving a gesture from a user via a user interface.

9. The computer program product of claim 6, wherein determining that the first data transmission of the plurality of data transmissions is suspicious further comprises accessing a private distributed ledger comprising contact information for a plurality of legitimate contacts and determining whether a sender of the first data transmission is one of the plurality of legitimate contacts.

10. A computer implemented method for flagging data transmissions for retention of metadata within a personal data transmission and receipt web-based service, said computer implemented method performed by a computing system comprising a computer processing device and a non-transitory computer readable medium, where the computer readable medium comprises configured computer program instruction code implemented within a personal data transmission and receipt web-based service, such that when said instruction code is operated by said computer processing device the computing system performs the method steps comprising:

receiving a plurality of data transmissions represented in a transmission queue, wherein the data transmissions are electronic mail (email) and the transmission queue is an email inbox associated with a user;

determining that a first data transmission of the plurality of data transmissions is suspicious, wherein determining comprises receiving a predetermined singular input from the user that indicates that the first transmission is suspicious; and in response to the determination, automatically:

flagging the first data transmission for retention of metadata associated with the first data transmission, wherein the metadata comprises data included in a header of the first data transmission; and placing the flagged first data transmission in a first queue for suspicious transmissions, wherein placing the first data transmission in the first queue for suspicious transmissions includes at least one of (i) forwarding the data transmission to another predetermined recipient, and (ii) moving the transmission into a designated folder visible in a user interface of the personal data transmission and receipt web-based service; and in response to both (i) flagging the first data transmission for retention of the metadata associated with the first data transmission, and (ii) determining that the first data transmission is suspicious, automatically storing the metadata associated with the first data transmission, in a second queue for data transmission metadata retention, prior to placing the flagged first data transmission in the first queue for suspicious transmissions.

\* \* \* \* \*